April 24, 1962   G. LE PARQUIER   3,031,659
MOVING TARGET INDICATING SYSTEM
Filed April 9, 1958   2 Sheets-Sheet 1

April 24, 1962  G. LE PARQUIER  3,031,659
MOVING TARGET INDICATING SYSTEM
Filed April 9, 1958  2 Sheets-Sheet 2

United States Patent Office 3,031,659
Patented Apr. 24, 1962

3,031,659
MOVING TARGET INDICATING SYSTEM
Guy Le Parquier, Paris, France, assignor to Compagnie Generale de Telegraphie Sans Fil, a corporation of France
Filed Apr. 9, 1958, Ser. No. 727,306
Claims priority, application France Apr. 19, 1957
4 Claims. (Cl. 343—7.7)

The present invention relates to target detecting systems and is more particularly concerned with the elimination of fixed echoes and the selection of echoes from targets having a speed comprised within a predetermined speed range.

It is generally desirable in radar techniques to eliminate echoes not only from stationary objects, but also from objects which can be termed quasi stationary, i.e. those which are subjected to a comparatively slow movement such as, for example, the waves on the sea surface. Such echoes are likely to produce undesired clutter on a radar display screen.

To avoid such clutter it might appear desirable to increase the pulse recurrence frequency; this would, however, lead to a simultaneous reduction of the radar range.

It is an object of the invention to eliminate echoes from stationary objects and from objects whose speed does not exceed a predetermined value, without reducing the radar range. According to the invention, recurrent pairs of pulses are transmitted, with a view toward using the Doppler phase-shift thus produced between the two pulses of a pair. This amounts, in fact, to increasing periodically the recurrence frequency of the pulses without reducing the radar range.

The transmitted pulses either are coherent, or are detected, when reflected as echoes, by means of respective coherent detectors, i.e. detectors in which the respective reference signals are provided by oscillators respectively coherent with the two transmitted pulses. The two pulses of a pair are so spaced that a target moving at a radial speed, which is the central speed of the speed range of the considered targets, preferably covers in the time interval separating the two pulses of the pair, a distance substantially equal to the quarter operating wave length of the radar.

The echoes reflected by such targets are therefore in phase opposition and provide, after coherent detection, signals of opposite polarity. Under these conditions and assuming that the phase difference, necessary to distinguish between the respective echoes corresponding to the two pulses of a pair of pulses, is 10°, it can be readily seen that the speed of the objects which can be detected ranges from $$\frac{Vm.10}{180} \text{ to } Vm\left(2-\frac{10}{180}\right)$$

Vm being the central speed of the speed range considered.

Under these conditions, the echoes of targets moving at a speed comprised within the above speed range and corresponding respectively to the two pulses of a pair provide, after phase detection, signals differing either in amplitude, or in polarity or both. These signals are collected in two different channels.

A third channel comprises a conventional amplitude detector delivering, for each pulse, echoes corresponding both to stationary and mobile targets.

A series of operations, which will be described hereinafter and which are carried out on the output signals of the above three channels enable the elimination of any undesired echo.

The invention will be best understood from the following description and appended drawings, wherein.

Figure 1:
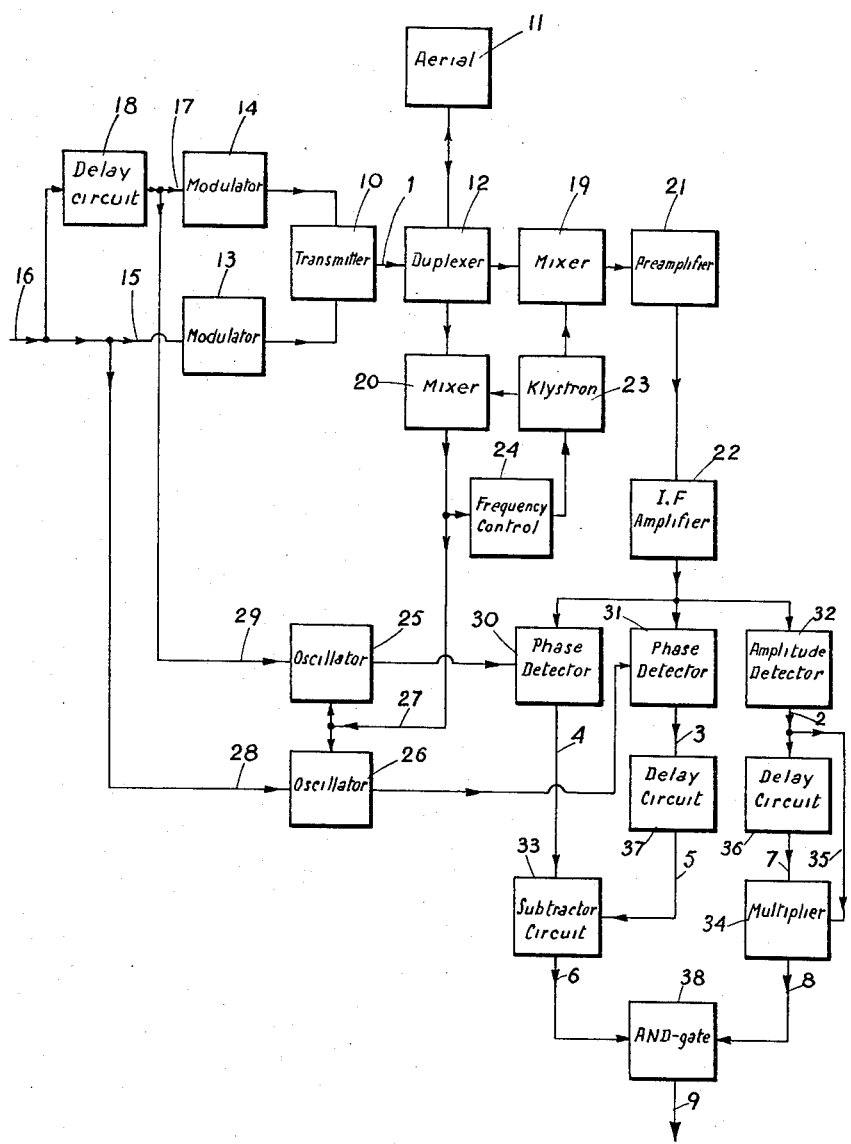
FIG. 1 shows a block diagram of a radar system according to the invention.

Referring to FIG. 1, a transmitter 10, which may be, for example, a magnetron oscillator, feeds pairs of recurrent pulses to an aerial 11 through a duplexer 12. Transmitter 10 is pulse modulated to this effect by two modulators 13 and 14. Modulator 13 is controlled at 15 by the conventional synchronizing signals of the radar system applied at 16 to the system shown in FIG. 1. Modulator 14 is controlled at 17 by the same synchronizing signals. In this case the synchronizing signals are delayed in a delaying device 18 by a time equal to the interval by which it is desired to separate the two pulses of a pair. Device 18 may be of any conventional type.

At the receiving end, two mixers 19 and 20 are coupled in parallel to the output of duplexer 12 and a local oscillator, such as a klystron 23, is coupled to both mixers in order to provide intermediate frequency beat signals. Mixer 19 feeds a preamplifier 21 and an intermediate frequency amplifier 22, connected in series.

Mixer 20 feeds a conventional automatic frequency control device 24 which controls the frequency of klystron 23, to stabilize the beat frequency provided by the mixers. Mixer 20 also controls at 27 the phase of two coherent oscillators 25 and 26 which are started by the synchronizing signals applied thereto at 28 and 29, respectively. These oscillators thus produce oscillations which, at the moment the two pulses of a same pair are transmitted, take respectively the phase thereof, i.e. are coherent with these pulses respectively.

It has been indicated that pairs of coherent pulses can be used in the radar system of the invention. It is the difficulty inherent to the transmission of coherent pulse which has led to the use of coherent reference oscillators. Actually, it is preferable to transmit pairs of pulses the respective phases of which are entirely random and to record these phases by means of the two oscillators 28 and 29 which are started at the precise instant of the transmission of these pulses and are thus entirely coherent therewith.

Therefore, intermediate frequency amplifier 22 feeds three detectors 30, 31 and 32 which are arranged in parallel at the output of this amplifier. Detectors 30 and 31 are conventional phase detectors and detector 32 an equally conventional amplitude detector. Phase detector 31 compares the phase of the first pulse of each pair with the phase of the echo thereof at the intermediate frequency level. Phase detector 30, does the same for the second signal of each pair. The output signals of phase detectors 30 and 31 provide in channels 3 and 4, respectively, video frequency signals differing either in amplitude or polarity, or both in amplitude and polarity. Amplitude detector 32 provides in channel 2 video frequency signals which have the same polarity, whether the target is stationary or moving.

Figure 2:
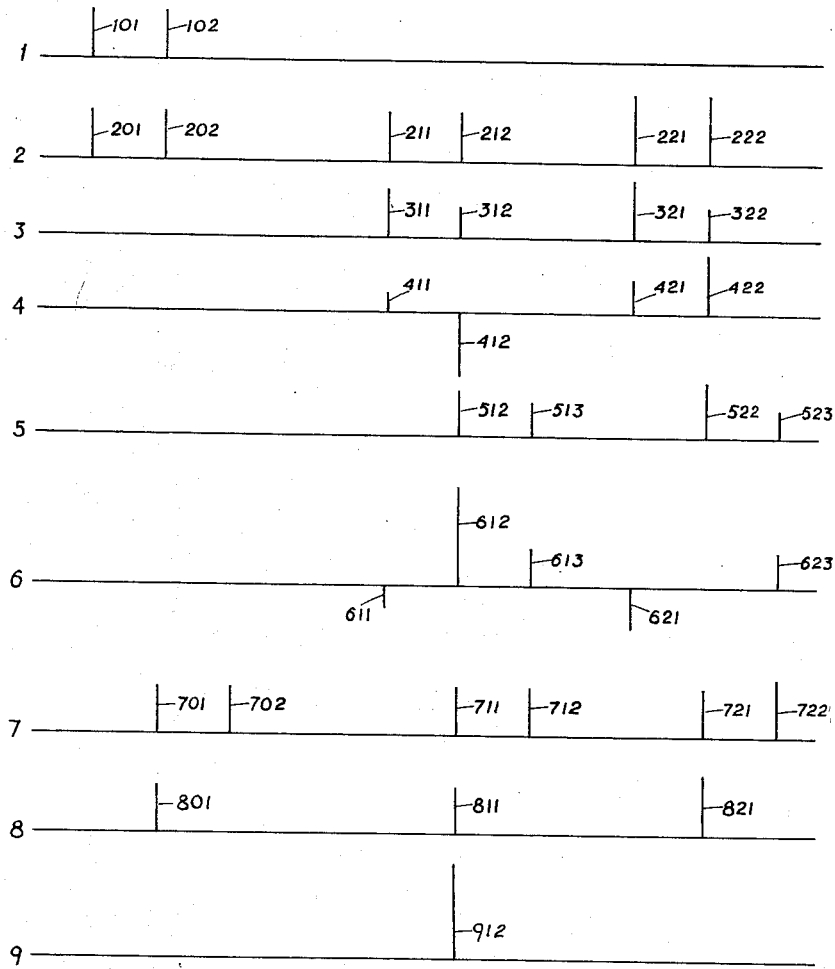
FIG. 2 is a diagram showing the signals in the various channels of the system of FIG. 1.

The subsequent treatment of signals issuing from detectors 30, 31, 32 should be followed both on FIG. 1 and FIG. 2, wherein the various channels are designated by the same reference numerals as in FIG. 1.

The two transmission pulses 101 and 102 of a same pair appear in channel 1.

In channel 2, i.e. at the output of the amplitude detector 32, are found at the intermediate frequency level the two transmission pulses 201 and 202 which have passed through duplexer 12 and, for example, two echo signals 211 and 212 reflected by a moving target, and two echo signals 221 and 222 reflected by a stationary target.

In channel 3, i.e. at the output of phase detector 31, are found at the intermediate frequency level echoes 311 and 312 reflected by a moving target and echoes 321 and 322 reflected by a stationary target. It should be noted that detector 31 operates as a coherent detector only for the first pulse of each pair of pulses. Accordingly, signals 312 and 322 are of no interest from the point of view of the present invention since they do not provide any information capable of being used for discriminating fixed and mobile echoes.

In channel 4, i.e. at the output of phase detector 30, mobile echoes 411 and 412 and fixed echoes 421 and 422 are found, only signals 412 and 422 being of interest for the same reason as above.

Comparing signals in channels 3 and 4, it is important to note that signal 311 and signal 412, normally differ either in amplitude or polarity, or both. If these two signals were accidentally and momentarily of the same amplitude and polarity, this situation would be of a strictly transitory nature, since the target is in motion.

On the contrary, in so far as stationary echoes are concerned amplitude and phase fluctuations between the two pulses of a same pair may be considered as negligible. Consequently, echoes 321 and 422 exhibit the same amplitude.

The invention is based on this difference, which is used for eliminating stationary echoes.

To this effect, output signals of phase detector 30 are fed to a subtractor circuit 33 of a conventional type, and so are the output signals of detector 31, through the intermediary of a circuit 37 impressing on these signals a delay equal to the time interval separating the two pulses of a pair. Thus, signals 311, 312 and 321, 322 appearing in channel 4 and signals 512, 513 and 522, 523 appearing in channel 5 are subtracted from each other to provide signals 611, 612, 613, 621 and 623 in channel 6. It is to be noted that signal 612, corresponding to the second pulse, will always be present in channel 6, since signals 311 and 412 always differ from one another in amplitude, phase or both. Fixed echoes 321 and 422 are eliminated by this subtraction. Signals 611, 613, 621 and 623 are of no interest, as already mentioned and will be presently eliminated.

To this effect channel 2 feeds a delay circuit 36, of a conventional nature, to provide delayed signals 701 and 702, 711 and 712, 721 and 722 in channel 7. Signals from channels 2 and 7 are fed to a multiplier 34 at the output of which a signal 801, corresponding to a radiated pulse, a signal 811, corresponding to the echo of this pulse on the moving target, and a signal 821, corresponding to the echo of the stationary target, are provided.

Channels 6 and 8 feed a coincidence circuit or AND-gate 36. Only signals 612 and 811 being in coincidence, the only signal found at the output 9 of gate 38 is signal 912, i.e. the echo reflected by the moving target. This signal is fed to the radar indicator.

A major advantage of the invention lies in the suppression of the echoes from objects whose radial speed lies outside the speed range for which the radar is designed and, more specifically, in the elimination of the echoes from objects undergoing relatively slow fluctuations, such as forests stirred by the wind, clouds in motion or wave-agitated sea surface, which are liable to cause undersirable clutter to appear on the display screen of the radar. By varying the time interval between two pulses of a pair, echoes from any object having a speed less than a predetermined value can be readily eliminated from the display screen of the radar. To vary this time interval, it is merely necessary to vary the delay impressed upon the synchronizing pulses of the radar by the delay circuit 18.

It is to be understood that the invention is in no way limited to the embodiment described and illustrated which has been selected only by way of example.

What I claim is:

1. A radar system comprising: means for transmitting recurrent pairs of signals, each pair comprising a first and a second signal separated by a time interval which is shorter than the time interval between two consecutive pairs; means for receiving said signals as reflected echoes; a series circuit comprising a first phase detector which is coherent for said echoes of said first signal and a delay circuit; a second phase detector which is coherent for said echoes of said second signal; amplitude detecting means; said series circuit, said second phase detector and said amplitude detecting means being coupled in parallel to said receiving means; a subtracting circuit having two inputs respectively coupled to said series circuit and to said second phase detector and an output; an AND-gate having a first input coupled to said output and a second input; a second delay circuit coupled to said amplitude detecting means; a multiplier, having two inputs respectively coupled to said second delay circuit and to said amplitude detecting means, and an output coupled to said second input of said AND-gate; said delay circuits having a delay equal to the time interval between two signals of a pair.

2. A system according to claim 1 wherein said interval between two signals of a pair has such a duration that a target, having a radial speed which is the center speed range of the targets to be detected by the radar, covers during this interval a distance equal to a quarter of the radar operating wavelength.

3. A radar system comprising: means for transmitting recurrent pairs of signals, each pair comprising a first and second signal separated by a predetermined time interval which is shorter than the time interval between two consecutive pairs; means for receiving said signals as reflected echoes; means for changing the frequency of said echoes for providing intermediate frequency signals; a first and a second phase detector respectively coherent with said first and second signal and an amplitude detector for detecting said signals; said first and second phase detectors and said amplitude detector being coupled in parallel to said frequency changing means; a delay circuit coupled to said first phase detector; a subtracting circuit having two inputs respectively coupled to said second phase detector and to said delay circuit and an output; an AND-gate having a first input coupled to said output and a second input; a second delay circuit coupled to said amplitude detector; a multiplier having two inputs, respectively coupled to said second delay circuit and to said amplitude detector, and an output coupled to said second input of said AND-gate; said delay circuits having a delay equal to said predetermined time interval.

4. A radar system comprising: a transmitter for transmitting recurrent pairs of signals; a first and a second modulator for pulse modulating said transmitter; means for delaying one of said modulators with respect to the other to separate the signals of each pair by a predetermined time interval which is shorter than the time interval between two consecutive pairs; means for receiving said signals as reflected echoes; means for changing the frequency of said echoes for providing intermediate frequency signals; a first and a second phase detector and an amplitude detector for detecting said signals, said phase detectors and said amplitude detector being coupled in parallel to said frequency changing means; a first and a second oscillator for providing respective reference signals to said phase detectors; means for starting said oscillators upon said transmitter starting to transmit and means for putting said oscillator signals respectively in phase with said transmitted signals; a delay circuit coupled to said first phase detector; a subtracting circuit having two inputs respectively coupled to said second phase detector and to said delay circuit and an output; an AND-gate having a first input coupled to said output and a second input; a second delay circuit coupled to said amplitude detector; a multiplier having two inputs respectively coupled to said second delay circuit and to said amplitude detector, and an output coupled to said second input of said AND-gate; said delay circuits having a delay equal to said predetermined time interval.

References Cited in the file of this patent
UNITED STATES PATENTS

| | | |
|---|---|---|
| 2,714,205 | Grayson | July 26, 1955 |
| 2,776,425 | Altman | Jan. 1, 1957 |
| 2,842,761 | Downs | July 8, 1958 |